United States Patent [19]

Kempken et al.

[11] Patent Number: 4,700,957
[45] Date of Patent: Oct. 20, 1987

[54] POWER-OPERATED CHUCK

[75] Inventors: Rainer Kempken, Erkrath; Hans Stolzenberg, Korschenbroich, both of Fed. Rep. of Germany

[73] Assignee: Paul Forkardt GmbH & Co., Düsseldorf, Fed. Rep. of Germany

[21] Appl. No.: 893,665

[22] Filed: Aug. 6, 1986

[30] Foreign Application Priority Data

Aug. 6, 1985 [DE] Fed. Rep. of Germany ....... 3528120

[51] Int. Cl.$^4$ ............................................. B23B 31/16
[52] U.S. Cl. .................................. 279/117; 279/119; 279/121
[58] Field of Search .......... 279/1 SJ, 1 DC, 110–123, 279/1 F, 1 H

[56] References Cited

U.S. PATENT DOCUMENTS 1,832,480  1/1931  Forkardt ............................ 279/119

FOREIGN PATENT DOCUMENTS 958893   2/1957  Fed. Rep. of Germany ...... 279/121
3322201  1/1985  Fed. Rep. of Germany ...... 279/110
173407  10/1982  Japan ................................. 279/110
1381146  1/1975  United Kingdom ................ 279/121
2016311  9/1979  United Kingdom ................ 279/123

Primary Examiner—Z. R. Bilinsky
Attorney, Agent, or Firm—Becker & Becker, Inc.

[57] ABSTRACT

A power-operated chuck that is provided with a plurality of clamping jaws that are disposed in a chuck body in such a way as to be radially movable. The radial clamping movement of the clamping jaws is produced by a gear mechanism disposed in the chuck body and via an axial movement of a drive member. Radial positioning of the clamping jaws relative to the starting position of the drive member is adjustable, prior to carrying out a clamping stroke, for shifting the clamping stroke within the clamping range, with adjustment being effected by an adjustment member that acts simultaneously upon all of the clamping jaws. Via an additional axial movement, the drive member can be conveyed to a position that is beyond the clamping range, and in which position the clamping jaws are uncoupled from the drive member. An additional adjustment member is axially movably disposed in the chuck body. This member is connected via respective gear mechanisms to all of the clamping jaws, and during clamping movements of the drive member is carried along in a non-powered state. When the clamping jaws are uncoupled from the drive member, the adjustment member can be operated in a controlled manner to carry out a radial adjustment of the clamping jaws relative to the drive member.

6 Claims, 8 Drawing Figures 4,700,957

POWER-OPERATED CHUCK

BACKGROUND OF THE INVENTION

1. Field of the Invention

The present invention relates to a poweroperated chuck, especially a hollow chuck that is provided with a central through-bore and is intended for use with numerically controlled turning machines.

2. Description of the Prior Art

Power-operated chucks are known, for example, from German Offenlegungsschrift No. 32 33 917 Rohs dated Mar. 15, 1984 and 32 41 590 Nobuoka et al dated May 10, 1984. To radially adjust clamping jaws to a clamping diameter desired at any given time, both of these heretore known constructions separate the actual clamping jaw from the driving jaw, and dispose a spindle between the jaw components. The spindles of all of the clamping jaws are adjusted simultaneously by a turning mechanism.

The drawback of these known constructions is that the entire clamping force must be transmitted to the threads via the spindles and hence via a linear contact. In addition, the turning or rotary drive mechanism closes off the central throughbore of the chuck that is required for a large number of clamping tasks, so that the heretofore known constructions are not suitable for use with hollow chucks. Finally, operation of an adjustment mechanism requires the use of a rotary drive mechanism that must rotate along with the chuck. This requires a considerable technical outlay, which is not only expensive but also does not operate precisely.

An object of the present invention, in a power-operated chuck, is to embody an adjustment member for shifting the clamping stroke within the clamping range in such a way that a radial adjustment is also possible, with little technical outlay, for one-piece clamping jaws of known construction, in order to achieve a high clamping force with a short clamping stroke and with great repetitive accuracy, whereby despite the use of a separate adjustment mechanism, the chuck is to be provided with a through-bore.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
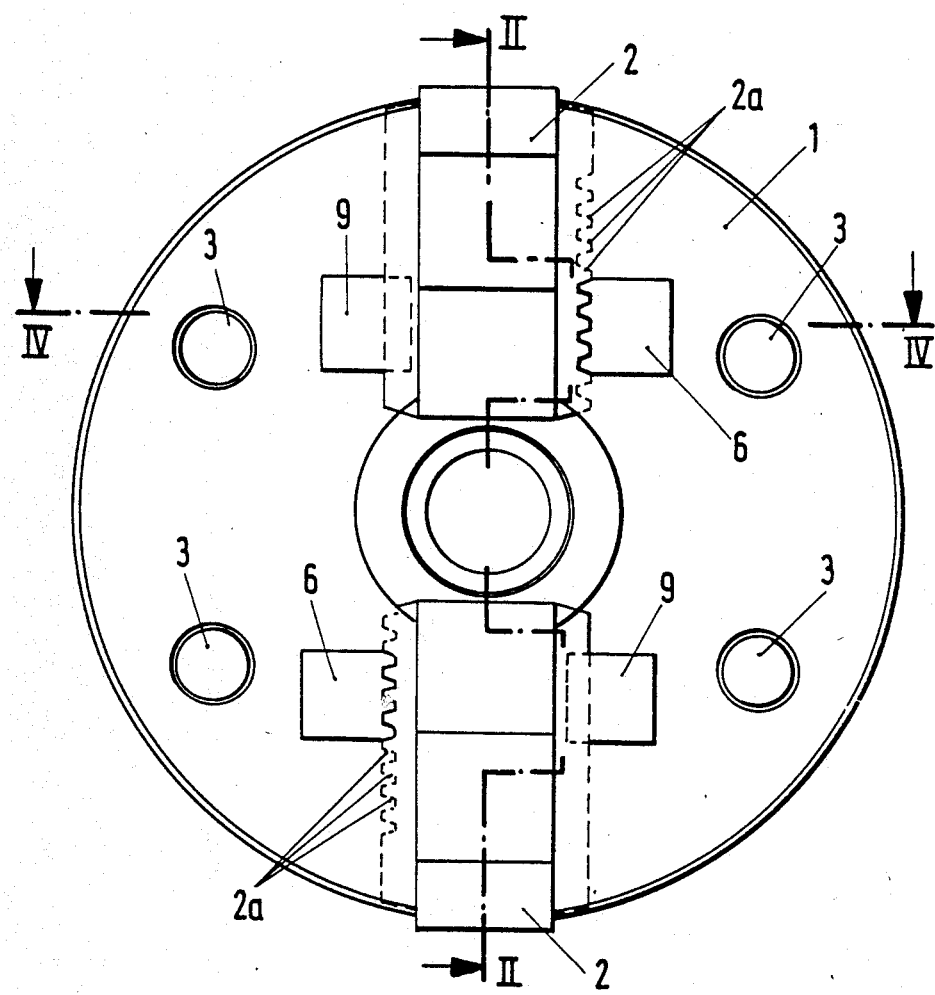
FIG. 1 is an end view of the first inventive embodiment of a chuck.

The power-operated chuck of the present invention comprises: a chuck body; a plurality of clamping jaws that are disposed in the chuck body in such a way as to be radially movable; first gear means disposed in the chuck body and engageable with the clamping jaws for effecting radial movement of the latter; an axially movable drive member operatively connected with the first gear means for actuating the latter, with the drive member being axially movable in a first position where the first gear means is in engagement with the clamping jaws, and with the drive member also being axially movable in a second position where the first gear means is uncoupled from the clamping jaws; an adjustment member that is axially movably disposed in the chuck body; and second gear means operatively connected with the adjustment member and with all of the clamping jaws for effecting radial adjustment of the latter, when the drive member is in the second position and the first gear means is uncoupled from the clamping jaws, to shift the position of the latter relative to the first gear means and the drive member when the drive mechanism is in the first position, the adjustment member is carried along in a non-powered state.

Pursuant to the inventive proposal, a power-operated chuck is provided whereby, despite the possibility for shifting the clamping stroke within the clamping range, it is possible to retain the proven clamping drive with high clamping force and great repetitive precision. The adjustment member is operated with the aid of a conventional axial drive mechanism that is disposed without difficulty on the rotating spindle and enables a precise axial adjustment. This construction, which can also be utilized for the production of hollow chucks, transmits the entire clamping force via a proven clamping gear mechanism without having to divide the clamping jaws. On the whole, the inventive proposal results in a chuck that relies upon proven structural elements and, with little technical outlay, enables shifting of the clamping stroke at any given time within the prescribed clamping range.

Pursuant to a further feature of the present invention, the gear mechanism between the drive member, which is embodied as a chuck piston, and each clamping jaw can be embodied as a grooved member having at least one tooth that meshes with gear teeth of the clamping jaw. Alternatively, it is also possible pursuant to the present invention to embody the gear mechanism between the drive member and each clamping jaw as a lever that is pivotably mounted in the chuck body and that engages in one of several recesses of the clamping jaw.

Pursuant to a preferred embodiment of the present invention, the gear mechanism between the adjustment member and the clamping jaws is embodied as respective keyed members. However, this adjustment member can also be embodied as a lever that is pivotably mounted in the chuck body.

Yet another proposal of the present invention is to have the grooved member of the clamping mechanism and the keyed member of the adjustment mechanism for each clamping jaw engage on opposite sides of that clamping jaw, so that the components of the gear mechanisms for the clamping drive and the adjustment drive can be uniformly distributed in the chuck body.

Further specific features of the present invention will be described in detail subsequently.

Description of Preferred Embodiments

Referring now to the drawings in detail, the first exemplary embodiment illustrated in FIGS. 1 to 4 shows a power-operated chuck that has a chuck body 1 in which, in the illustrated embodiment, two clamping jaws 2 are movably guided in the radial direction. Of course, instead of two clamping jaws, it is also possible to dispose three or more of such clamping jaws in the chuck body 1. Via a plurality of screws 3, the chuck body 1 is secured to a mounting ring 4 which in turn is attached by means of screws 5 to the flange of a non-illustrated arbor or spindle of a machine tool.

In the embodiment illustrated in FIGS. 1 to 4, one side surface of the clamping jaws 2, which have stepped clamping or gripping surfaces, is provided with trapezoidal-shaped gear teeth 2a that mesh with corresponding gear teeth of a grooved member 6 which is guided in the chuck body 1 in such a way as to be movable in the axial direction. Via a recessed portion at the back end, the two grooved members 6 are connected with a clamping piston 7 that is similarly guided in the chuck body 1 in such a way as to be axially movable. Thus, the gear teeth arrangement between the grooved members 6 and the clamping jaw 2, which is inclined relative to the axis of rotation of the chuck body 1, effects a radial adjustment of the clamping jaws 2 when the clamping piston 7, and hence the grooved members 6, are moved in the axial direction. This clamping or chucking movement is generated by a drive mechanism, preferably a hydraulic cylinder, that is advantageously disposed at the rear end of the non-illustrated spindle. In the embodiment illustrated in FIGS. 1 to 4, the gear mechanism that serves to convert the axial movement into a radial clamping movement comprises the piston 7 as a drive member, the grooved members 6, and the trapezoidal-shaped gear teeth 2a that are provided between each grooved member 6 and the pertaining clamping jaw 2.

Since with power-operated chucks the clamping stroke of the clamping jaws 2 is normally less than the clamping area that is to be covered by the chuck, the radial position of the clamping jaws 2 relative to the starting position of the clamping piston 7 that serves as the drive member should be adjustable to shift the clamping stroke. For this purpose, in addition to the clamping drive an adjustment drive is disposed in the chuck body 1. In the first illustrated embodiment, this adjustment drive comprises an adjustment piston that serves as an adjusting member. The front end of the adjustment piston 8 is drivingly connected with the rear end of two keyed members 9. In the illustrated embodiment, these members 9 are provided with a raised portion 9a that extends at an angle to the axis of rotation of the chuck body 1. In the manner of a tooth, this raised portion 9a meshes with a correspondingly inclined recess in that side of the clamping jaw 2 disposed opposite that trapezoidal-shaped gear teeth 2a. The adjustment drive thus comprises the adjustment piston 8, which serves as the adjusting member, and the keyed members 9 that mesh with the clamping jaws 2 via the raised portions 9a. The adjustment piston 8 is also connected to an axial drive mechanism, preferably a hydraulic cylinder, that is disposed at the rear end of the non-illustrated spindle of the machine tool.

Figure 2:
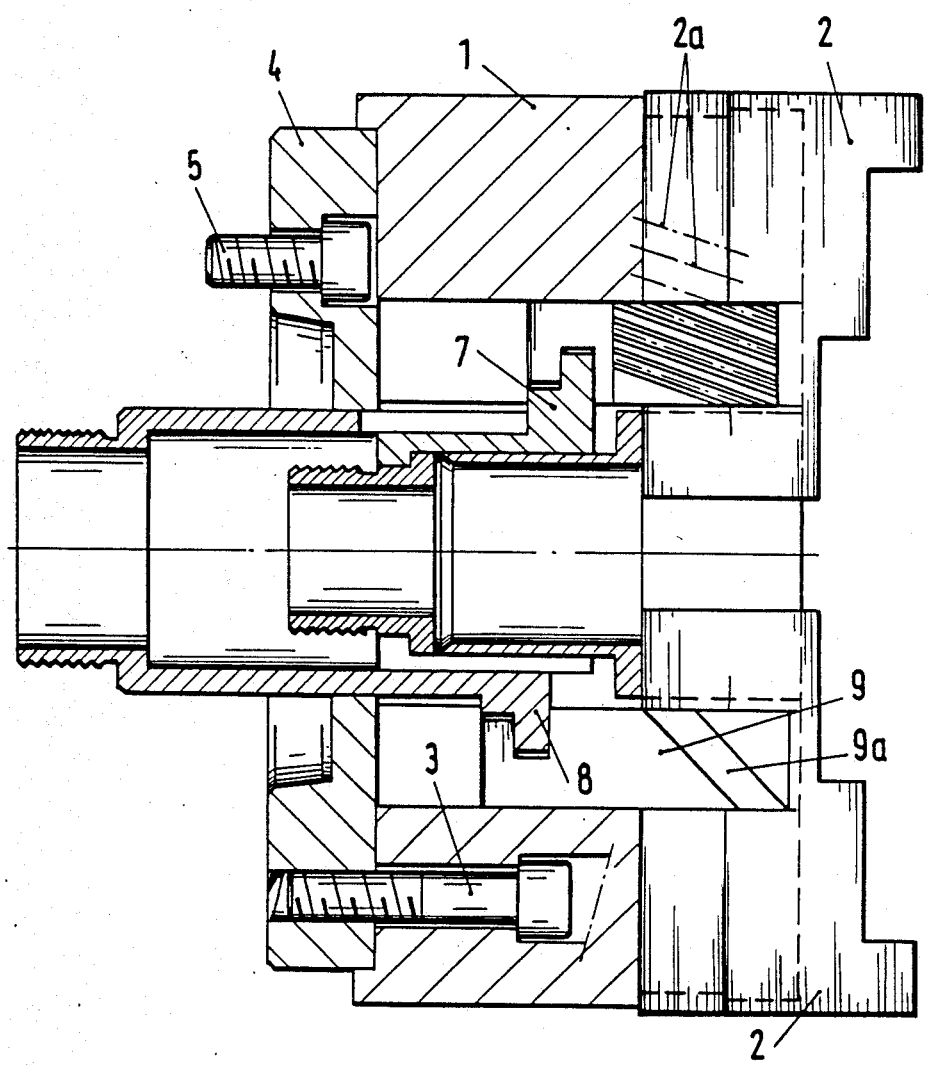
FIG. 2 is a cross-sectional view taken along the line II—II in FIG. 1, and shows a clamping mechanism in the operating position.
Figure 3:
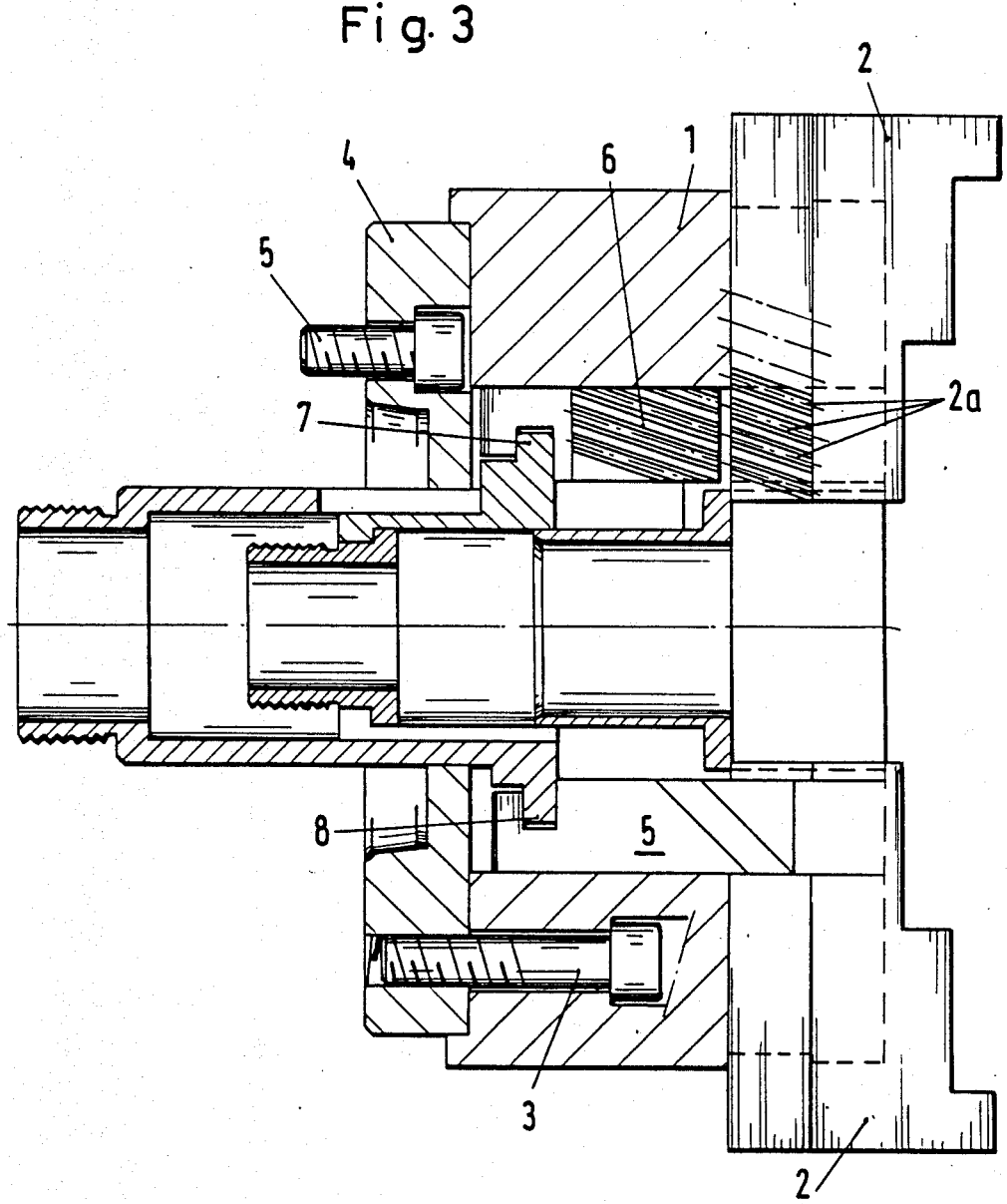
FIG. 3 is a cross-sectional view similar to that of FIG. 2, and shows the clamping mechanism in a position in which the drive member is uncoupled from the clamping jaws in order to adjust the clamping stroke via the adjustment member.
Figure 4:
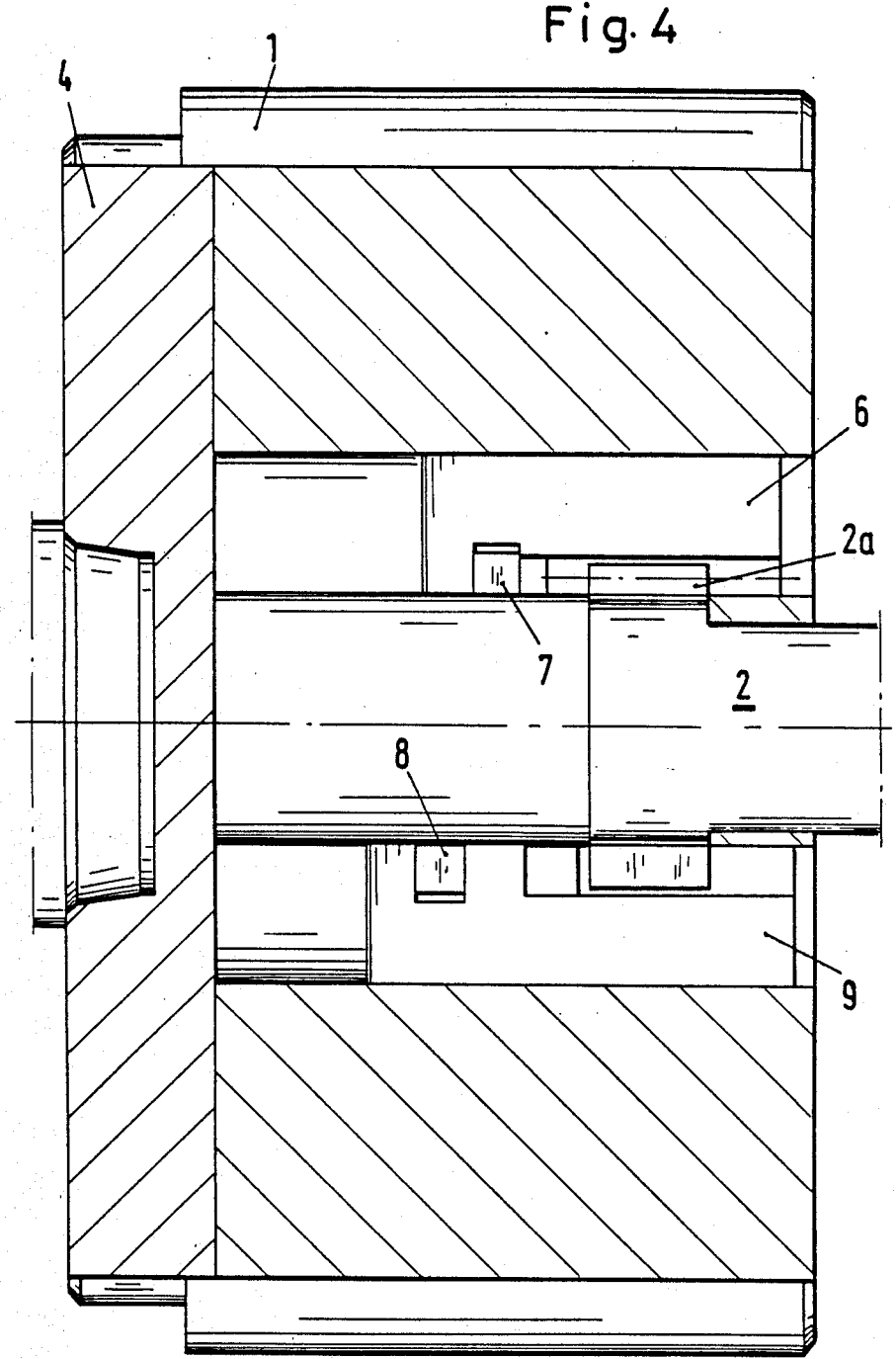
FIG. 4 is a cross-sectional view taken along the line IV—IV in FIG. 1.

In order to be able to adjust the clamping stroke of the clamping jaws 2 to the clamping diameter of the workpiece that is to be clamped-in at any given time, the clamping piston 7 is conveyed by an additional axial movement from its normal position as shown in FIG. 2 to a position that is beyond the clamping area, as indicated in FIG. 3. In so doing, the gear teeth of the grooved member 6 become disengaged from the trapezoidal gear teeth 2a of the clamping jaws 2. Via an axial movement of the adjustment piston 8, the clamping jaws 2 can now be adjusted in the radial direction since the axial movement of the keyed members 9 results in a radial adjustment movement of the clamping jaws 2 due to the inclined course of the raised portion 9a that meshes with the clamping jaw 2. After the clamping jaws 2, with the aid of the previously described adjustment drive, have assumed the desired starting position for the clamping stroke that is to be carried out, the grooved members 6 of the clamping drive are again brought into engagement with the trapezoidal gear teeth 2a of the clamping jaws 2 via an axial movement of the clamping piston 7.

The desired clamping stroke can now be carried out, with the keyed members 9, and hence the adjustment piston 8, being carried along by the clamping jaws 2 in a non-powered fashion. For this purpose, when carrying out the clamping stroke, the drive mechanism for the adjustment piston 8 is turned off or otherwise made ineffective.

Figure 5:
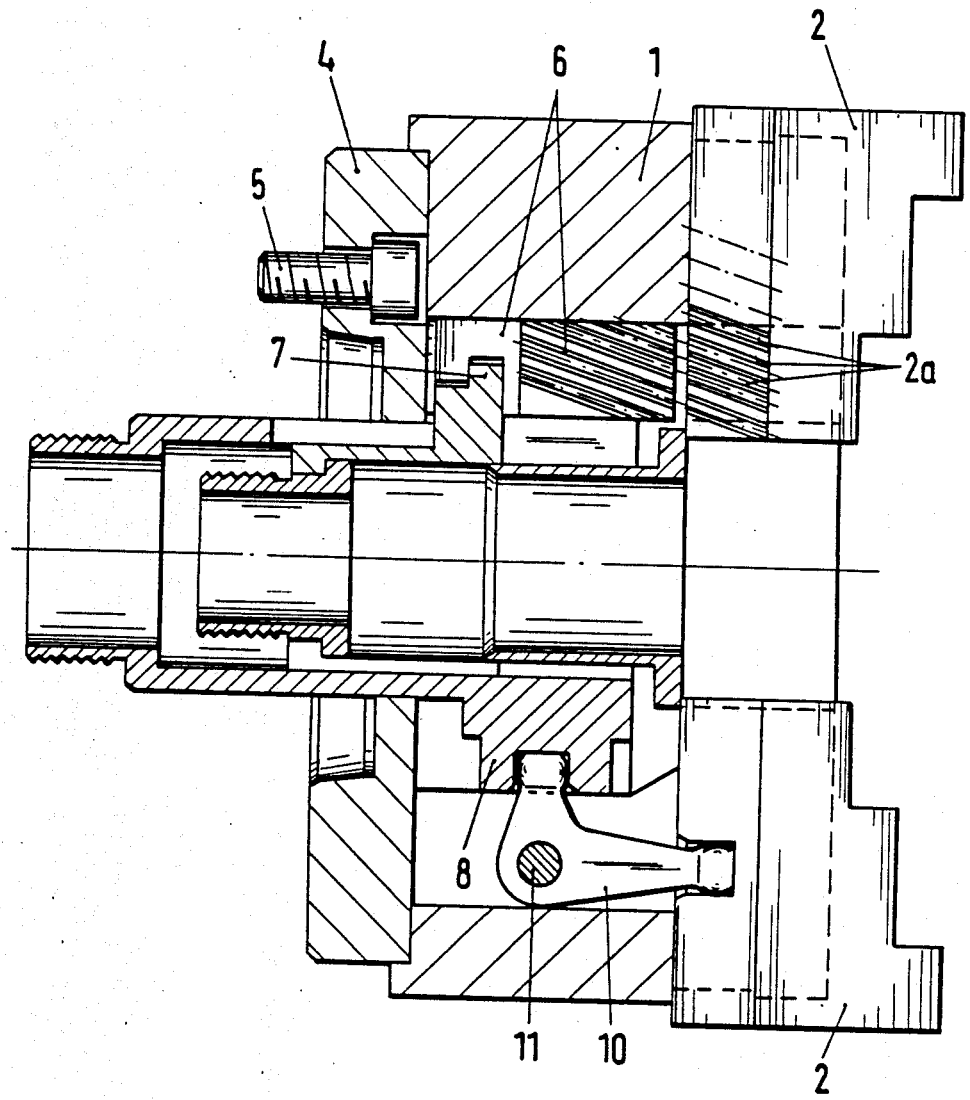
FIG. 5 is a cross-sectional view similar to that of FIG. 3, and shows a second inventive embodiment.

In the second embodiment of FIG. 5, the clamping drive corresponds to that of the first embodiment. However, the adjustment drive has a different configuration. In particular, the adjustment member of this adjustment drive is again an adjustment piston 8 which, however, in this case cooperates with an arm of a two-arm lever 10 that is pivotably mounted in the chuck body 1 on a pin 11. The other arm of the lever 10 extends into a recess provided in the back side of the associated clamping jaw 2, as can be seen in the bottom half of FIG. 5.

Also in the embodiment of FIG. 5 the adjustment drive follows in an idle or non-powered state when the clamping drive is actuated. However, if the clamping jaws 2 are uncoupled from the pertaining drive member 7, when the latter via an additional movement disengages the gear teeth of the groove member 6 and the clamping jaw 2, it is possible to effect a radial adjustment of the clamping jaws 2, via the adjustment drive, to the clamping diameter desired at any given time. In this connection, an axial movement of the adjustment piston 8 with the aid of the lever 10 results in a radial adjusting movement of the clamping jaws 2.

Figure 6:
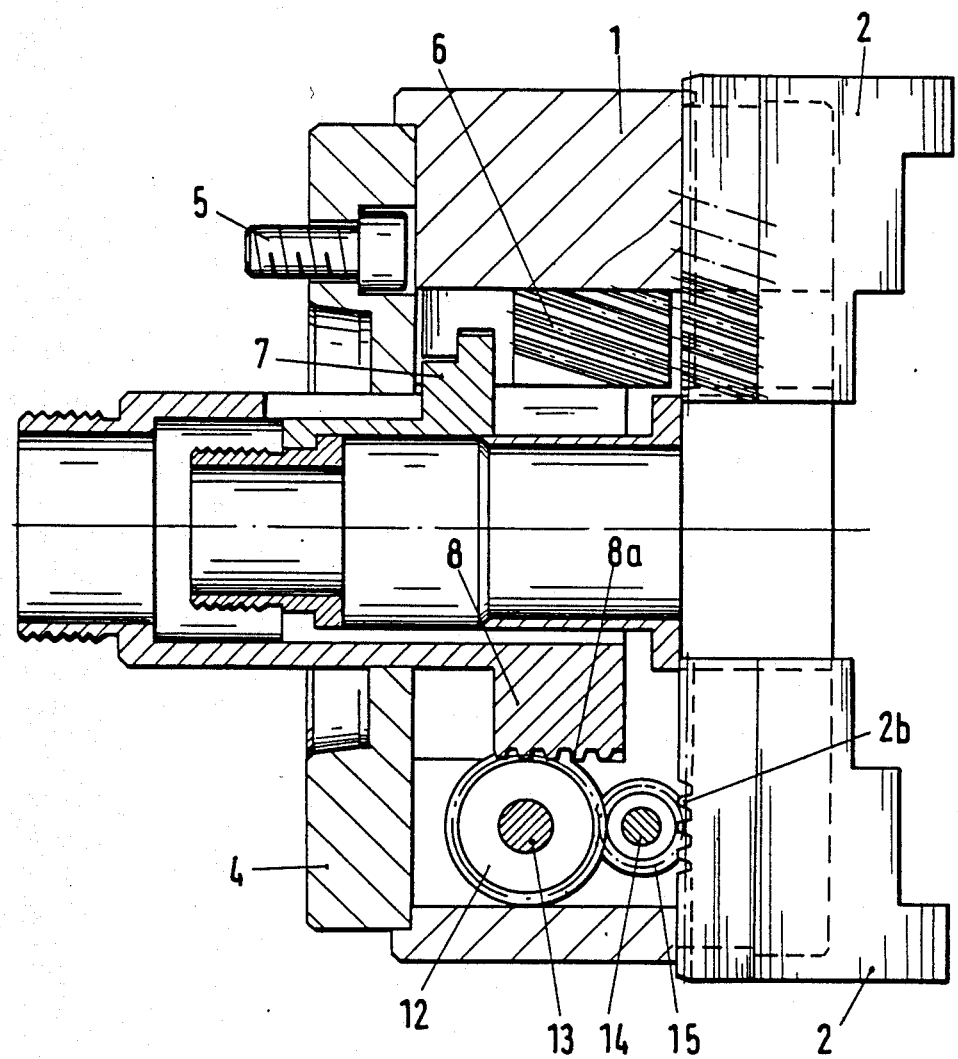
FIG. 6 is a further cross-sectional view similar to that of FIG. 3, and shows a third inventive embodiment.

Also in the third exemplary embodiment of FIG. 6, a groove member drive is used for the clamping drive of the illustrated chuck, with this drive including grooved members 6 that have trapezoidal gear teeth and that are actuated by a clamping piston 7 as the drive member. In this third embodiment, the adjustment drive again comprises an adjustment piston 8, which this time is provided with gear teeth 8a that mesh in a gear wheel 12 that is freely rotatably mounted in the chuck body 1 on a shaft 13. A pinion 15 that is freely rotatably mounted on a shaft 14 meshes with the gear wheel 12. The pinion 15, in turn, meshes with gear teeth 2b that are provided on the back side of the pertaining clamping jaw 2 in the manner of a rack.

Thus also with this embodiment of the adjustment drive, an axial movement of the adjustment piston 8 results in a radial adjustment movement of the clamping jaws 2. With all of the aforementioned embodiments of the adjustment drive, the adjustment movements of the clamping jaws 2 are effected synchronously, since the pertaining gear mechanism is operated in common by the adjustment piston 8.

Figure 7:
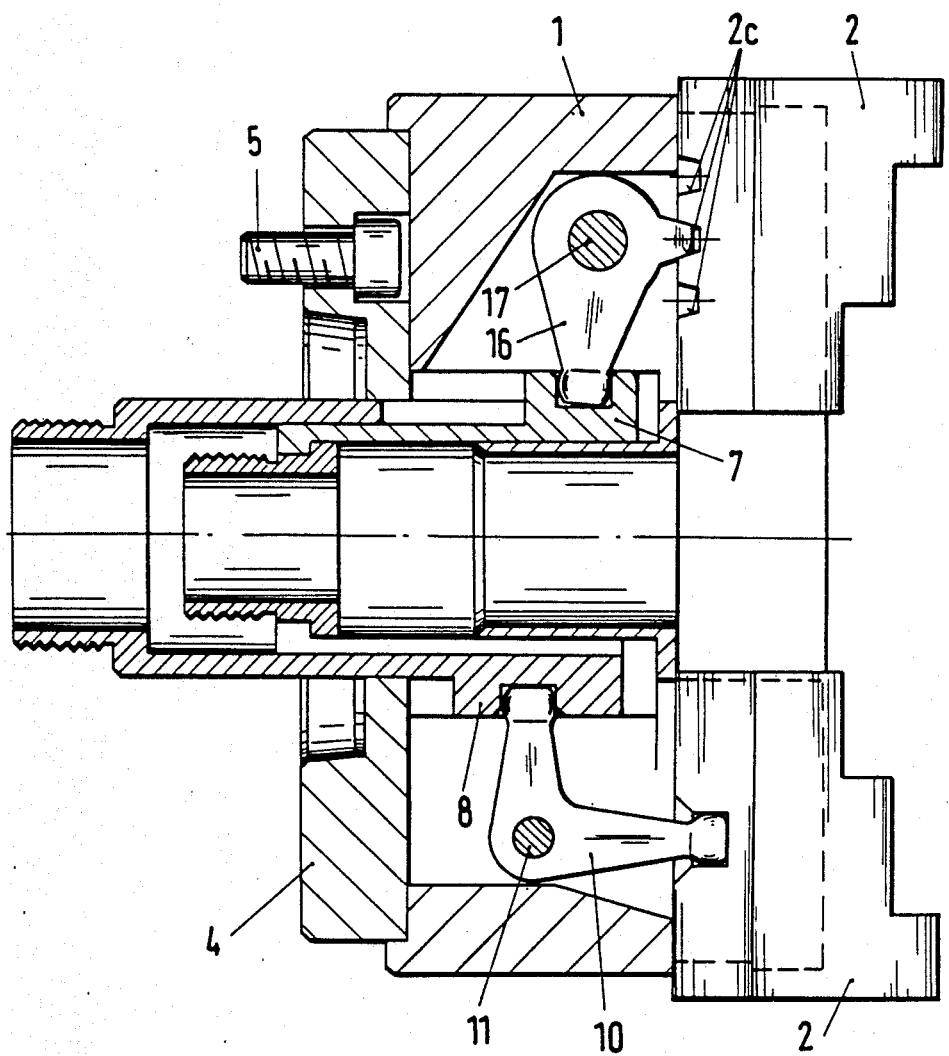
FIG. 7 is a cross-sectional view similar to that of FIG. 2, and shows a fourth exemplary embodiment of the inventive chuck.
Figure 8:
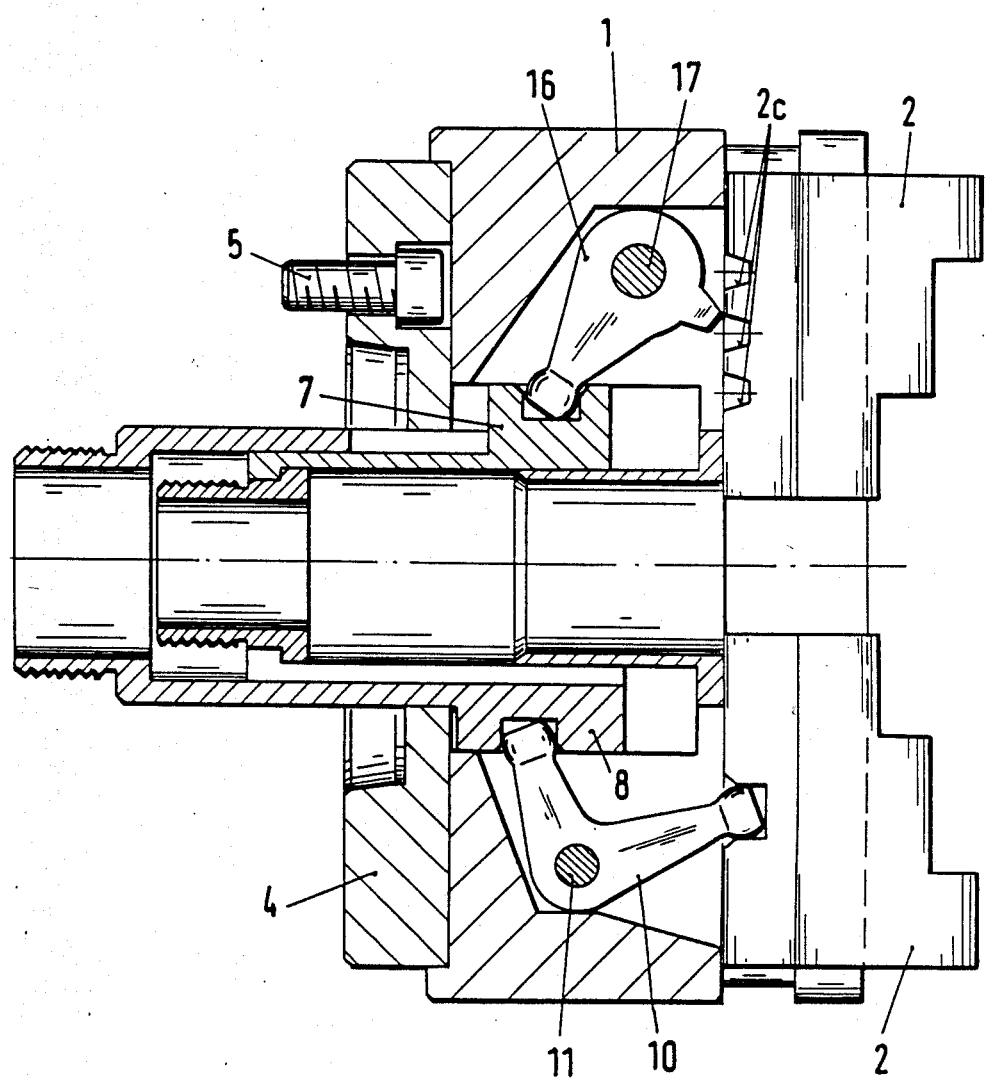
FIG. 8 is a cross-sectional view corresponding to that of FIG. 7, and shows the clamping mechanism in the uncoupled state.

FIGS. 7 and 8 show a fourth exemplary embodiment. In this case, levers 10 are utilized as the adjustment drive. These levers 10, as in the embodiment of FIG. 5, are pivotably mounted in the chuck body 1 on pins 11, and are actuated by the adjustment piston 8.

In this fourth embodiment, the gear mechanism or the clamping drive for each clamping jaw 2 also includes a lever 16 that is pivotably mounted in the chuck body 1 on a in 17. The longer arm of this lever 16 is in engagement with the clamping piston 7. The short arm of each lever 16 meshes with one of several recesses 2c provided in the back side of the clamping jaws 2. Via an additional movement of the clamping piston 7 toward the rear, the shorter arm of the lever 16 leaves that recess 2c in which it found itself after the previous adjustment (see FIG. 8). The radial position of the clamping jaws 2 can now be adjusted in common via the adjustment drive illustrated in the lower half of FIGS. 7 and 8. In the illustrated embodiment, three recesses 2c are provided in each of the clamping jaws 2 so that there are three possible starting positions for the clamping jaws. As soon as the clamping jaws 2 have achieved the desried position, the clamping drive is returned to the clamping area. In so doing, the shorter arm of the lever 16 enters the recess 2c of the clamping jaw 2 disposed in front of it at that time. The clamping or chucking task required at any given time can now be carried out; as this is being accomplished, the adjustment drive is again taken along in a non-powered or idle state.

The present invention is, of course, in no way restricted to the specific disclosure of the specification and drawings, but also encompasses any modifications within the scope of the appended claims.

What we claim is:

1. A power-operated chuck, comprising:
   a chuck body;
   a plurality of clamping jaws that are disposed in said chuck body in such a way as to be radially movable;
   first gear means disposed in said chuck body and engageable with said clamping jaws for effecting radial movement of said clamping jaws;
   an axially movable drive member that is operatively connected with said first gear means for actuating said first gear means, with said drive member being axially movable in a first position where said first gear means is in engagement with said clamping jaws, and with said drive member being axially movable additionally in a second position where said first gear means is uncoupled from said clamping jaws;
   an additional adjustment member that is axially movably disposed in said chuck body; and
   second gear means operatively connected with said additional adjustment member and with all of said clamping jaws for effecting radial adjustment of said clamping jaws, when said drive member is in said second position and said first gear means is uncoupled from said clamping jaws, to shift the position of said clamping jaws relative to said first gear means and said drive member; when said drive member is in said first position, said additional adjustment member is carried along in a non-powered state.

2. A chuck according to claim 1, in which said clamping jaws are provided with gear teeth, and said first gear means comprises grooved members, each of which has at least one tooth for meshing with said gear teeth of one of said clamping jaws.

3. A chuck according to claim 1, in which each of said clamping jaws is provided with several recesses, and said first gear means comprises levers that are pivotably mounted in said chuck body for respectively engaging one of said recesses of one of said clamping jaws.

4. A chuck according to claim 1, in which said second gear means comprises keyed members.

5. A chuck according to claim 1, in which said second gear means comprising lever means pivotably mounted in said chuck body.

6. A chuck according to claim 1, in which for a given one of said clamping jaws, said first and second gear means are disposed on opposite sides of that clamping jaw.

* * * * *

UNITED STATES PATENT AND TRADEMARK OFFICE
CERTIFICATE OF CORRECTION

PATENT NO. : 4,700,957

DATED : October 20, 1987

INVENTOR(S) : RAINER KEMPKEN ET AL

It is certified that error appears in the above-identified patent and that said Letters Patent is hereby corrected as shown below:

On the Title-Abstract Page, please correct the assignee name to read as follows:

[73] Assignee: Paul Forkardt GmbH & Co. KG, Düsseldorf, Fed. Rep. of Germany

Signed and Sealed this

Twenty-fourth Day of May, 1988

Attest:

DONALD J. QUIGG

Attesting Officer

Commissioner of Patents and Trademarks